United States Patent [19]

Frey et al.

[11] Patent Number: 4,531,903

[45] Date of Patent: Jul. 30, 1985

[54] APPARATUS FOR FORMING PARTICLES INTO SHAPED ARTICLES

[75] Inventors: David J. Frey; Keith E. Wier, both of Boulder, Colo.

[73] Assignee: SXD Refractories, Inc., Boulder, Colo.

[21] Appl. No.: 622,143

[22] Filed: Jun. 19, 1984

Related U.S. Application Data

[62] Division of Ser. No. 401,422, Jul. 23, 1982, Pat. No. 4,456,574.

[51] Int. Cl.[3] .......................... B28B 1/08; B29G 1/00

[52] U.S. Cl. .................................... 425/429; 425/425; 425/432; 425/453; 425/456

[58] Field of Search .............. 425/406, 415, 419, 421, 425/425, 429, 432, 453, 456

[56] References Cited

U.S. PATENT DOCUMENTS

| | | | |
|---|---|---|---|
| 2,407,168 | 9/1946 | Lindhvist | 425/421 X |
| 2,909,826 | 10/1959 | McElroy | 425/421 |
| 3,606,633 | 9/1971 | Engelmann | 425/432 |
| 3,743,468 | 7/1973 | Helmrich et al. | 425/421 X |
| 3,899,281 | 8/1975 | Jakobs | 425/432 |
| 3,932,100 | 1/1976 | Blindheim | 425/432 |
| 4,119,692 | 10/1978 | Durinck | 425/421 X |
| 4,179,258 | 12/1979 | Karas et al. | 425/421 X |
| 4,193,754 | 3/1980 | Sekiguchi | 425/421 X |
| 4,226,820 | 10/1980 | Bjorhaag | 425/421 X |
| 4,332,540 | 6/1982 | Vande Caveye | 425/421 X |

*Primary Examiner*—J. Howard Flint, Jr.
*Attorney, Agent, or Firm*—O'Rourke & Harris

[57] ABSTRACT

Method and apparatus for forming fine, relatively dry particles into shaped refractory, ceramic and porcelain preforms or similar compacted articles by confining the loose particles in a shaped enclosure having at least one movable, preloaded side to maintain the particles in a loose but contiguous mass, accelerating the mass particles and at least a portion of the mold in such a manner as to induce a positive or negative acceleration of the mass of a magnitude at least 25 to 50 G's, depending upon the particle composition, and preferably in the range of 500 G's to 5000 G's, or greater, again depending on the particle composition in order that each particle undergoes a force generating impact with adjacent particles to homogeneously compact and fuse the adjacent particles one to the other in a nonbridging manner. A preferred apparatus for accomplishing the abrupt acceleration and deceleration of the particles of the mass comprises a mold having fixed sidewalls and at least one movable end wall positioned on a vertically oscillating table and confined above the table by an underdamped system tuned to a frequency corresponding to the frequency of oscillation of the table, and preferably including a pneumatic cylinder and a punch member to provide the desired preload on the particle mass. In operation, the pneumatic cylinder and overhead structure are tuned to reciprocate with the mold approximately 180° out of phase with the table such that the mold is accelerated upward by the table upon impact of the mold, descending pneumatic cylinder and punch with the table in order that the particles are abruptly accelerated and/or decelerated thereby generating compacting and fusing forces at each particle throughout the particle mass.

5 Claims, 13 Drawing Figures

APPARATUS FOR FORMING PARTICLES INTO SHAPED ARTICLES

RELATED APPLICATION

This application is a division of now pending U.S. patent application, Ser. No. 401,422, filed July 23, 1982, now U.S. Pat. No. 4,456,574.

FIELD OF THE INVENTION

The present invention relates to an apparatus for compacting relatively dry, fine particles into low porosity, homogeneously dense articles by inducing high accelerations in the mass to generate compacting and fusing forces internally throughout the mass at the individual particles.

DESCRIPTION OF THE RELATED ART

Various methods which utilize either as a final step or an intermediate step the compacting of particles into a molded article by pressing or otherwise compacting the particles are known. The pertinent processes include those for forming refractory materials, ceramic materials, sintered materials and other related compacted shapes formed of particles. It is usually desirable to form the articles of dry, i.e. less than five percent moisture, mixtures. However, because of the well known "bridging" phenomenon associated with dry materials, casting of slurries is a common expedient though removal of the water adds to the cost and complication of the process as well as producing higher porosities in cast articles.

A number of limitations have been recognized in the compacting of dry particulate mixtures. Classically, the mixtures have been confined within fixed side wall and bottom molds with forces applied through a movable top mold wall, though movable top and bottom mold walls have also been employed. As pressure is increased and forces between individual particles close to the movable mold wall accordingly increase, the particles tend to fuse before a low porosity article is formed, i.e. localized interconnection between the particles is accomplished while relatively large voids between the particles exist. Further, as the particles tend to fit one between the other, a wedging action is generated in which the downward force on one particle tends to generate outward forces between two or more adjacent particles as the loaded particle attempts to wedge therebetween. As a result of these two phenomenon, and no doubt others, a finite thickness of particles tends to redirect forces applied in a nominal vertical direction to lateral horizontal forces which act upon the fixed walls of the mold, but are not transmitted to the interior of the particle. Therefore, relatively thick particulate articles undergo minimal compaction at the interior of the article, and undergo delamination at the portion of the article undergoing high lateral forces. Thus, increased forces applied to movable end surfaces quickly reach the point of diminishing returns in that the thicker articles are not compacted evenly, are not compacted appreciably at the center portions, and further undergo destructive delamination as the greater forces are applied laterally across the article.

As mentioned above, inclusion of substantial amounts of water to form a slurry both lubricates the article and particles to facilitate a relatively satisfactory casting, but at the expense of compromised density and a more complex process in that the water must be removed.

Other lubrication additives are also employed with similar results.

Various schemes have been devised to facilitate the compaction of dry particle mixtures. For instance, it is known to tamp relatively thin layers of mixture within a mold to build up a thicker, more compact article than can be accomplished by attempting to compact the article in one mass. While this approach provides limited advantages, the articles are still of relatively low density and uniformity, and are subject to high labor and/or machinery cost.

Though subject to many of the shortcomings of the simple pressing operation, minor improvements have been accomplished by rapidly and repeatedly impacting the movable wall of a mold to press particles into compacted articles. Such repeated impacts on the essentially static mold generates the above-discussed bridging and delamination limiting the characteristics, though the repeated impacts tend to break and reform the bridging with at least threshold improvements in quality.

More recently, vibration forming processes have been suggested in which the mold and incipient articles are subjected to very rapid vibrations while maintaining a heavy static load on the movable portion of the substantially conventional mold. The vibratory motion appears to minimize bridging and delamination and thus permits a greater portion of the static load to be transmitted through the particles. As a result, shapes up to about two hundred pounds and up to about six inches thick have been successfully formed with the bridging and wedging mechanisms offset to a certain extent by the vibration. In any event, the vibration is essentially sinusoidal, and thus does not produce forces of such a magnitude as to induce bonding or fusing between the particles, but instead serves to defeat the mechanism which limits transfer of forces from the movable portion of the mold to the interior of the article. The relatively mild, nonimpact changes in direction produce only low magnitude forces between particles. In a sense, the vibration tends to make the particles more fluid, thus accomplishing a force transfer more analagous to that accomplished in the slurry or wet mixtures. The so called Hans Stump process and Hirohata Steel Plant Process are typical of such vibration aided forming approaches.

SUMMARY OF THE INVENTION

The present invention, which provides a heretofore unavailable improvement over previous compacting devices, comprises an apparatus in which particulate matter is urged together at relatively low fixed and static interparticle forces to form a confined particle mass approximating the desired shape while the shape is subjected to rapid decelerations and/or accelerations whereby the kinetic energy of each particle throughout the mass is dissipated through particle microimpacts with adjacent particles to induce compaction and fusion of the particles evenly and thoroughly throughout the mass. The high forces throughout the mass not only induce fusion, but tend to break weak bonding between the particles which occur in the event of relatively substantial voids between the particles. Only when relatively large areas of adjacent particles have bonded together, and therefore fill a greater portion of void between the particles is the bond strong enough to withstand the high acceleration forces induced at the particles. Since the force generation is predicated on particles momentum, great masses and thicknesses may be accomodated while producing very dense and homogeneous articles.

Preferably, the compacting is accomplished by confining the mass within a mold having at least one movable wall, applying a preload force well below that necessary to fuse the mass to the movable portion of the mold, and rapidly impacting the mold at the movable portions thereof at opposed ends of a distinct displacement of the contents of the mold, usually in a vertical direction between an oscillating table and an underdamped pneumatic system tuned to oscillate out of phase with the table. Numerous variations in the method, i.e. multidirection movement, changing accelerations as the article compacts, differing preload pressures, during the process, etc., and in the apparatus may be practiced with worthwhile results. Often improved results with regard to specific characteristics may be obtained with increased complexity and cost. For the purposes of the instant disclosure, simplicity to the extent consistant with workable results will be emphasized.

Put succinctly, the instant invention is embodied in a new and unobvious apparatus for producing shaped products of high uniformed density and low porosity. The shapes may be of widely varying weights, i.e. from as little as five pounds or less, to several hundred pounds or much greater. When utilizing the apparatus as discussed below, the articles may be rapidly produced in a period of time ranging from about several seconds to several minutes.

The operation of the apparatus is initiated by placing the material to be molded in the form of particles of a preselected size in a mold having one or more plate or die movable relative to the fixed walls of the mold. An initial relatively low static preload pressure is applied to the movable portion of the mold to confine the particles within the mold. Initial force is not a forming or fusing step, and may be from as low as a few PSI to typically about 30 PSI in order that the particles roughly approximate the general shape of the desired article.

While maintaining the low static preload pressure, the mold and particles contained therein have been subjected to a series of high accelerations, preferably through impact in at least one direction. Such acceleration should be at least 25 G's to 50 G's, and preferably several hundred to several thousand G's. As a result of the repeated accelerations, the particles impact one against the other throughout the particle mass to form a dense particle substantially free of non-homogeneous areas and of low average porosity. In general, higher accelerations are desirable though, as the article forms as a relatively solid article from the particles, acceleration must be limited such that the article itself does not fail structurally as a result of the stresses induced by the acceleration forces. In general, less than a minute of repeated, high frequency impact accelerations are required and, in an often preferred embodiment, the initial velocity of the mold to generate the accelerations, may be of a greater magnitude than the final velocity of the mold to compensate for the initial cushioning effect of the loose particles which moderates the effective accelerations of the individual particles, but which cushioning is not present as the article forms the dense, homogenous fused mass. In the latter instance, the acceleration of the mold and of the fused mass are substantially equal. Of course, the nature of the material itself is of primary importance in determining the upper acceptable rate of acceleration of the process. It may be worthwhile to test the destructive conditions in the case of high production in that the greatest acceptable acceleration produces the lowest process time, while in custom, low production runs lower accelerations for a greater length of time may be employed. Though not yet tested, it is anticipated that the conditions of the forming process may be varied between the initial impacts at high velocity and lower velocity in the final such steps in the process.

Various appropriate apparatus may be utilized to practice the invention. Again though, not yet carried out in practice, it is anticipated that multidirectional accelerations and accordingly forces due to accelerations on an interparticle level will produce a perhaps improved article. However, reciprocation of the mold between a vibrating table and an underdamped oscillating beam and press has produced very worthwhile results. Such mechanism, which constitutes the preferred apparatus in that only such apparatus has been tested, will be described in greater detail below.

DETAILED DESCRIPTION OF THE DRAWINGS

Figure 1:
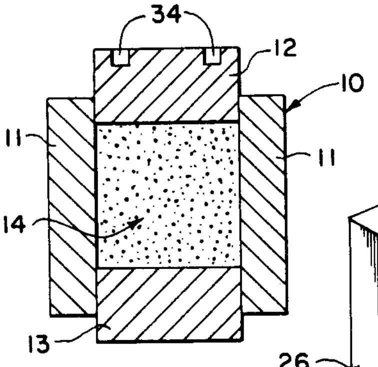
FIG. 1 is a simplified cross-sectional view of the mold as used in conjunction with the present invention.

Turning now to the drawings, wherein like components are designated by like reference numerals throughout the various figures, a device according to the instant invention is illustrated throughout the various figures. As shown in FIG. 1, mold 10 having relatively fixed sidewalls 11, (shown as rectangular, but not necessarily so) form an opening into which upper and lower end plates, 12 and 13, respectively, movably but snuggly fit. A charge of particulate material 14 is confined within the volume defined by side walls 11 and upper and lower end plates 12 and 13. Upper end plate 12 includes detents 34 to locate mold 10 as will be described in more detail below.

Figure 2:
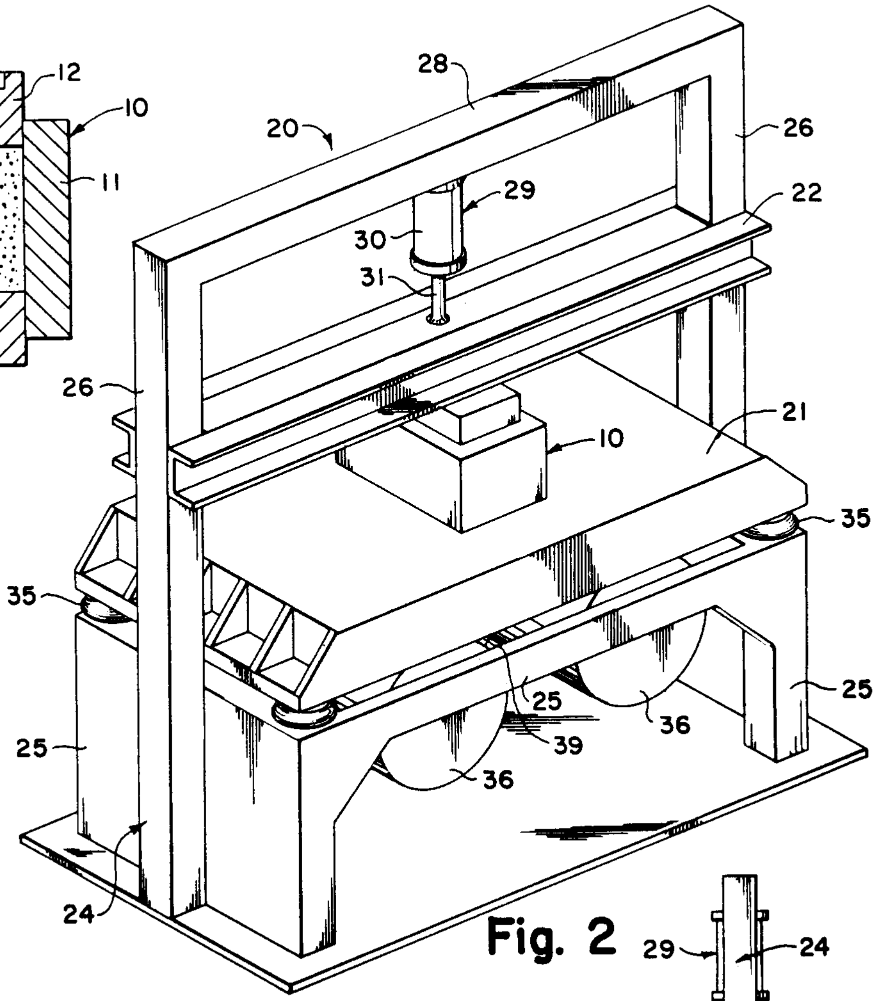
FIG. 2 is a perspective view of an illustrative apparatus according to the subject invention.
Figure 3:
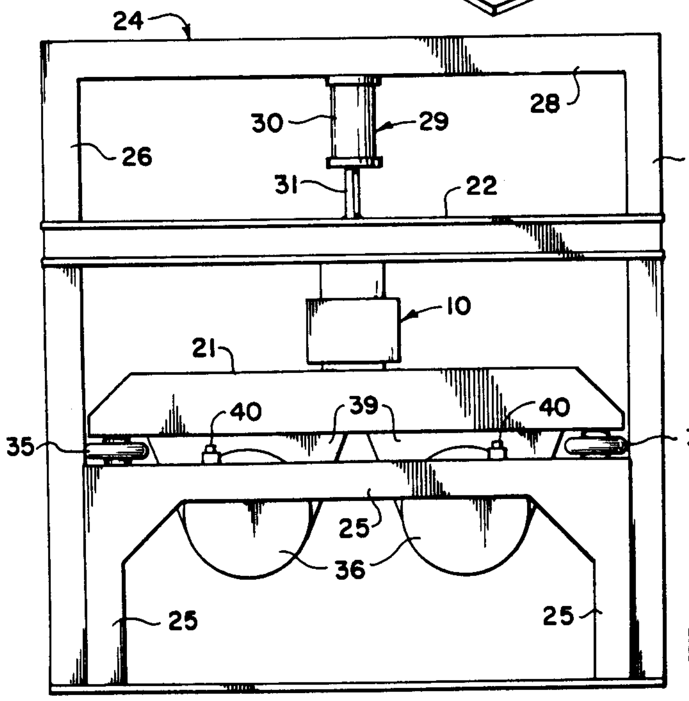
FIG. 3 is a front elevation of the apparatus shown in FIG. 2.
Figure 4:
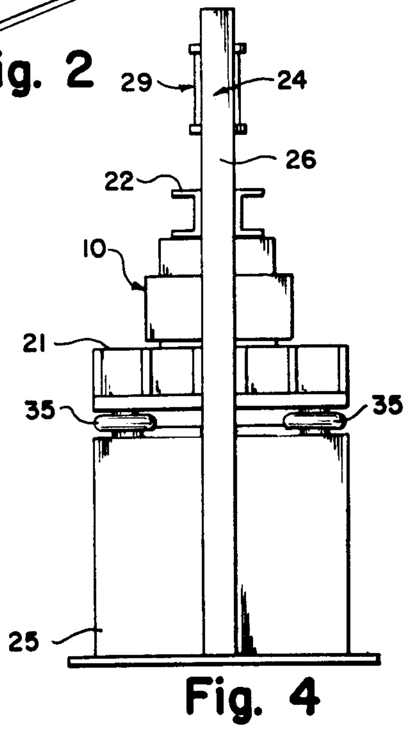
FIG. 4 is a side elevation of the apparatus shown in FIG. 2.

With reference to FIGS. 2 through 4, it will be seen that mold 10 is received in apparatus 20. Apparatus 20 comprises an oscillating table 21 which operates in conjunction with cross beam 22 movably secured relative to oscillating table 21.

More specifically, apparatus 20 comprises frame 24, and base section 25 on which the oscillating table 21 is mounted. A pair of spaced uprights 26, part of frame 24, support overhead fixed beam 28 to complete frame 24. Pneumatic ram 29, connected to a pneumatic pressure source (not shown), is positioned between overhead beam 28 and movable cross beam 22. Pneumatic ram 29 serves both as a pneumatic cylinder adapted to raise and lower cross beam 22, as well as a pneumatic dampener under dynamic conditions as wll be described in more detail below.

Though not illustrated in detail because of the conventional nature thereof, pneumatic ram 29 includes a cylinder portion 30 having a piston (not shown) movably and sealingly enclosed therein and connected to a rod 31 such that movement of the piston within cylinder 30 will cause rod 31 to expand and retract thereby moving cross beam 22 relative to overhead beam 28. In operation, mold 10 is placed upon oscillating table 21, ram 29 is pressurized to extend rod 31 to engage movable cross beam 22 with mold 10. As shown in FIG. 5*a*, cross beam 22 includes projections 32 adapted to fit within detents 34, shown in FIG. 1, to restrain mold 10 against lateral movement. Numerous other restraining means of course may be utilized as will be apparent to those skilled in the art.

Oscillating table 21 includes at each corner thereof one of four pneumatic airmounts 35 which may be individually preloaded by varying pressures to level oscillating table 21 when static, and which permit oscillating movement of table 21 as a result of the deformable nature of airmounts 35. To some extent, the pneumatic pressure in airmounts 35 influence the amplitude of table 21 when driven. Counter rotating motors 36 drive eccentric weights 38, shown in FIGS. 5 and 6, to induce a reciprocal movement of oscillating table 21, essentially in a sinusoidal manner. Since motors 36 are counter rotating, horizontal forces are nulled, and only vertical oscillation of table 21 is induced. Stops 40 provide an ultimate limitation on the oscillation of table 21.

Figure 6:
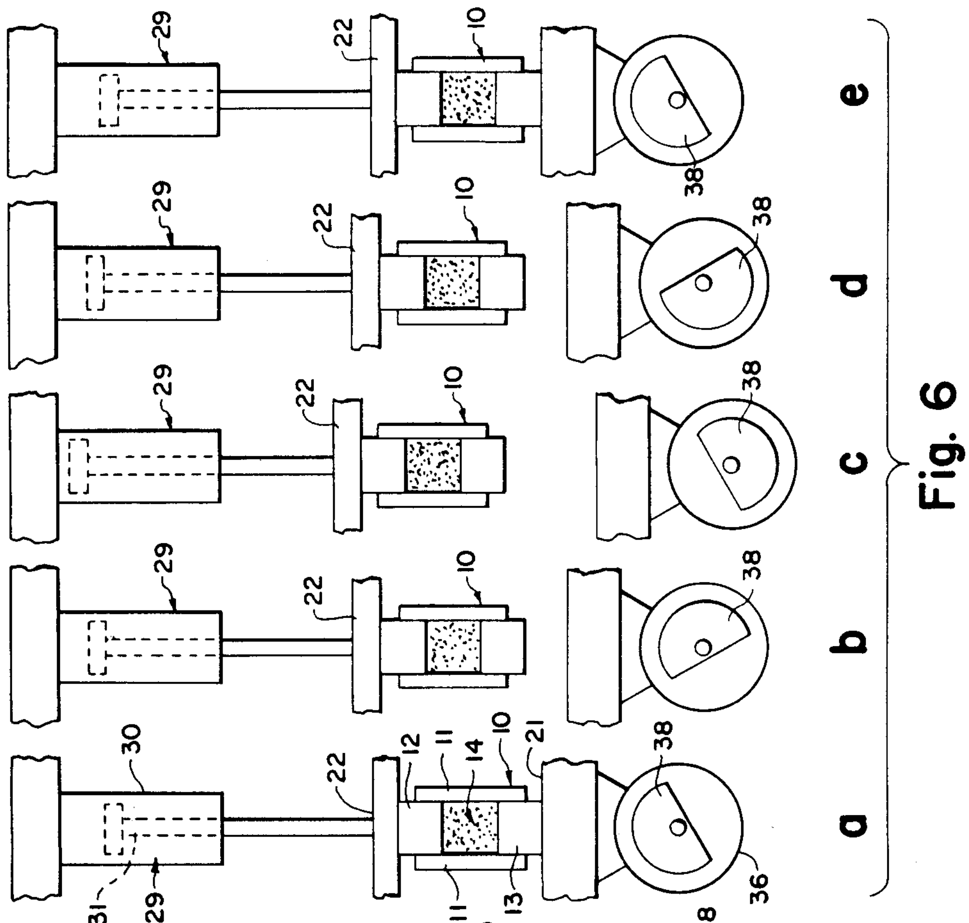
FIGS. 6*a* through 6*e* are simplified, generally diagrammatic views illustrating the apparatus of the instant invention in the steady state high acceleration generating impact phase of operation.
Figure 5:
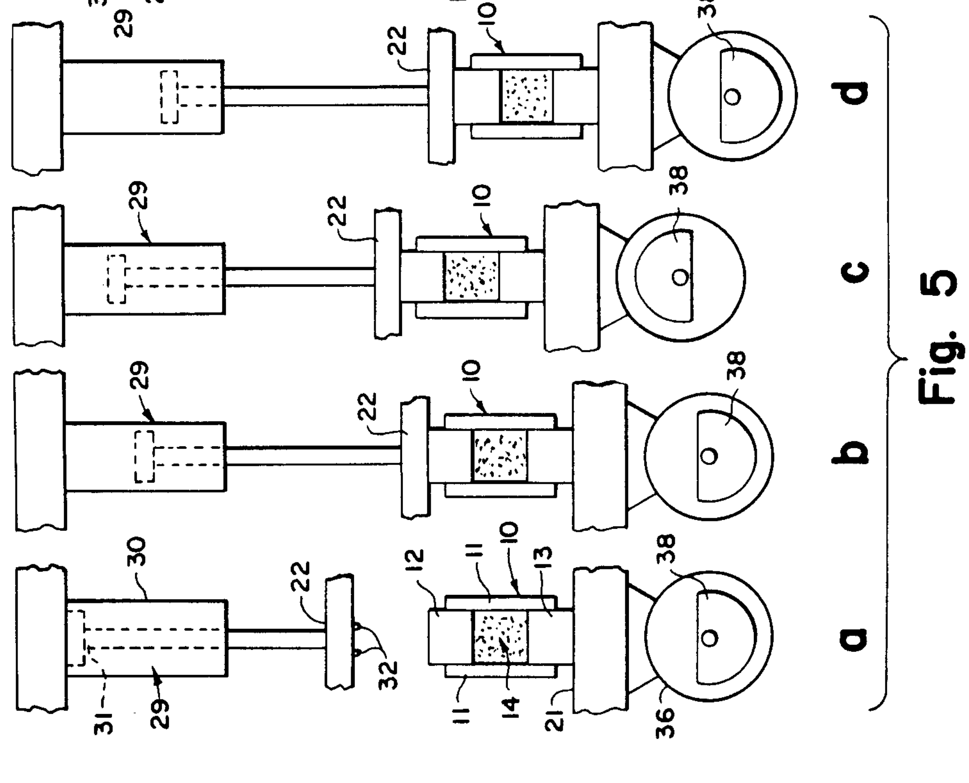
FIGS. 5*a* through 5*d* are simplified diagrammatic views illustrating the apparatus of the instant invention during the initial start up phase.

Operation of the apparatus may be more readily understood with reference to variations of FIGS. 5 and 6. In FIGS. 5*a* through 5*d*, the initial start up stage is illustrated. For purposes of simplicity in illustrating the concept, eccentric weight 38 is shown as being in phase with the movement of table 21, i.e. when eccentric weight 38 is fully down, as shown in FIG. 5*a*, oscillating table 21 is similarly illustrated as being at the low point of oscillation, In fact, it is anticipated that a substantial phase angle between the position of eccentric weight 38 and the position of oscillating table 21 will exist, but this is of little importance and will be ignored for simplicity of explanation.

FIG. 5*a* illustrates mold 10 positioned on oscillating table 21 below cross member 22. As pressure is applied to pneumatic ram 29, cross member 22 is forced down into engagement with mold 10 as shown in FIG. 5*b*. Typically, a pressure on the contents of mold 10 on the order of 30 PSI is adequate, but the pressure within pneumatic ram 29 is perhaps more importantly determined by the dynamic operation of ram 29 as a pneumatic dampener as will be described in more detail. As eccentric weight 38 rotates, as shown in FIG. 5*c*, table 21 moves upward thereby moving mold 10 and ultimately cross member 22 upward. Upon start up of apparatus 20, the dampening action of pneumatic ram 29 is adequate to maintain mold 10 in contact with table 21 such that a mere sinusoidal vibratory movement of mold 10 occurs. Such movement is typical of a damped condition and is not the desired operating condition in accord with the instant invention in that only relatively low peak accelerations are involved.

As shown in FIGS. 6*a* through 6*e*, as motor 36 spins eccentric weight 38 to full speed, an entirely different operating condition is induced, i.e. an underdamped oscillation of mold 10. Such impact oscillation as shown in FIGS. 6*a* through 6*e* is entirely distinct from the vibratory oscillation shown in FIGS. 5*a* through 5*d* which latter movement is typical only of the initial start up phase of the instant invention.

With eccentric weight 38 at full speed in the clockwise direction as illustrated in the various FIGS. 6*a* through 6*e*, as specifically shown in FIG. 6*a*, table 21 will be moving upward, thus inducing mold 10, as shown in FIG. 6*b* to continue moving upward away from table 21 by compressing the compressible gas in pneumatic ram 29 as eccentric weight 38 passes the top dead center position and causes table 21 to move downward. Though it is to be understood that the timing relations set forth in FIGS. 6*a* through 6*e* are illustrated only as being approximate and are operable over a substantial variation, as shown in FIG. 6*c* mold 10 reaches the upper amplitude of movement as pneumatic ram 29 substantially compresses the gas therein while table 21 approaches a bottom dead center relationship in the oscillation thereof. Accordingly, as shown in FIG. 6*d*, table 21 approaches maximum upward velocity—a condition reached at the mid point of oscillation—while mold 10 being urged by the rebounding pneumatic ram 29 also approaches a maximum velocity, whereupon a high impact, and accordingly a high negative acceleration, occurs as mold 10 abruptly crashes into table 21. Depending upon the exact pressure setting in pneumatic ram 29, the various masses and amplitudes, mold 10 may immediately rebound from table 21, or, as shown in FIG. 6*e*, may be damped to the extent of being carried upward therewith momentarily to again repeat the cycle of leaving table 21 to again be impacted thereon to generate a high G acceleration, and accordingly very high interparticle forces. Such oscillating impacts occur at a very high frequency, i.e. the frequency of oscillation of table 21, in most cases and depending upon selectable operating conditions, typically generate accelerations of 3000 G's to 5000 G's. By varying the pneumatic pressure in pneumatic ram 29, the impact and accordingly the acceleration generated may be controlled. Higher pressures limit the excursion of mold 10 thereby providing for lower impact velocity.

It is to be understood, of course that to generate the oscillating impact motion illustrated in FIGS. 6*a* through 6*e* the natural frequency of the two movable systems, i.e. table 21 and mold 10 in associated masses movable therewith must have appropriate natural frequencies to provide the appropriate timing relation. A certain amount of tolerance is permissible. For instance, though it is preferable that mold 10 impact table 21 in the mid point of the oscillation, i.e. when the acceleration of the table is zero and accordingly the velocity maximized, such optimum conditions may be varied somewhat since the velocity varies sinusoidally and accordingly angles of 15° to 20° before or after maximum velocity may well provide completely acceptable results. As discussed above, the pneumatic pressure of pneumatic cylinder 29 may also be varied to determine the amplitude in dampening of mold 10. Those skilled in the art will recognize that mold 10 may also be excited at a harmonic frequency of table 21.

Thus, in summary, the apparatus of the instant invention involves confining particulate matter within a mold having at least one movable wall in order that the volume of the mold may be varied. The mold is then subjected to very high accelerations, at least 25 G's to 50 G's, and preferably up to several thousand G's, such that each particle undergoes the acceleration induced force as it impacts adjacent particles thereby avoiding non-homogeneous bridging mechanisms within the article. Since the compacting and fusing force is at the particle level, large but homogeneous masses may be quickly formed into very dense and homogeneous fused articles. It is anticipated that such acceleration forces may be generated by a great number of mechanisms. However, most worthwhile results have been attained by the described apparatus utilizing a simple oscillating table in conjunction with an underdamped pneumatic system such that the table undergoes essentially sinusoidal oscillation while the mold is displaced in a reciprocating manner to impact upon the table as the table moves upward and the mold moves downward. Such oscillating impacts generate very high G forces and have produced very dense articles of dry particles fused at an interparticle level.

Though not fully tested, it is anticipated that improved results may be obtained by varying the velocity at the mold from relatively high velocity as the process is initiated and the loose particles function to moderate the acceleration and impact forces at the particles, to lower but still substantial velocity as the article approaches a fully fused condition in which the uncushioned forces may in fact be so high as to fracture the fused article. Among other means, such variations in velocity may be accomplished by controlling the dampening on the resonant system comprising the mold and pneumatic cylinder, or by reducing the amplitude of the oscillating table. Also, though there is much to recommend the use of the resonantly oscillating pneumatic system which conserves energy, it is of course possible to merely accelerate and decelerate the mold by high impact blows from various directions. Again, though not tested, it is thought that more homogeneous stress patterns (though the stress patterns in the vertically oscillating device described above are lower by far than conventional pressed articles) may be gained by oscillating the mold in two or three orthogonal directions. From results to date, it is suggested that only in very demanding situations will the complexity of an apparatus for such movement be warranted since the simple apparatus described provides compacted articles more dense and particularly more homogeneous than those obtainable by any known process.

While only limited and illustrative apparatus of the present invention has been described in some detail above, it is to be understood that the invention is workable well beyond the illustrative and preferred embodiment presented herein. Accordingly, since numerous variations will be apparent to those skilled in the art, the invention is to be limited only by the scope of the appended claims.

What is claimed is:

1. Apparatus for producing compacted molded shapes from particulate materials, the apparatus comprising:

a mold defining a closed opening therein and having at least one movable wall defining the opening;

a movable support table adapted to support the mold with at least one movable wall of the mold parallel with the support table;

oscillating means connected to the support table to occillate the support table in the direction perpendicular to the movable mold wall with sufficient magnitude to throw the mold from the support table; and damper means carried on the apparatus and positioned to bear against the mold and toward the support table with a force less than that required to maintain the mold in contact with the support table during oscillation of the support table, whereby during occillation of the support table the mold will temporarily leave the table and be urged back into contact with the table by the damper means to generate acceleration levels at the mold substantially greater than the acceleration levels of the table.

2. An apparatus for producing compacted molded shapes as set forth in claim 1 in which the acceleration levels at the mold are at least 25 G's.

3. An apparatus for producing compacted molded shapes as set forth in claim 1 in which the acceleration levels at the mold are at least 50 G's.

4. The apparatus for producing compacted molded shapes as set forth in claim 1 in which the acceleration levels at the mold are in the range of 500 G's to 5000 G's.

5. An apparatus for producing compacted molded shapes as set forth in claim 1 in which the oscillating table is resiliently mounted, and carries a pair of counter rotating motors rotatably supplying off balance eccentric weights thereon to move the table vertically as the motors drive the eccentric weights, and in which the damper means comprise a cross beam adapted to interface with the mold and connected to the rod of a pneumatic ram comprising affixed cylinder and a movable piston therein, whereby oscillations of the table will impel the mold, cross beam and ram rod away from the table thereby compressing gas between the piston and cylinder, and in which the kinetic energy of the mold will be overcome by, and stored in the compressed gas whereupon the compressed gas will expand to drive the movable system towards the oscillating table.

* * * * *